United States Patent
Chung et al.

(10) Patent No.: US 6,239,931 B1
(45) Date of Patent: May 29, 2001

(54) TECHNIQUE FOR REASSIGNING DATA SECTOR BY DETECTING SOFT DEFECT

(75) Inventors: Ji-Hwan Chung; Yong-Soo Kim, both of Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/122,648

(22) Filed: Jul. 27, 1998

(30) Foreign Application Priority Data

Jul. 26, 1997 (KR) .................................................. 97-35381

(51) Int. Cl.[7] ........................................................ G11B 5/09
(52) U.S. Cl. .................................................................... 360/53
(58) Field of Search ............................... 360/53; 714/704, 714/770, 774

(56) References Cited

U.S. PATENT DOCUMENTS

| | | | |
|---|---|---|---|
| 5,150,050 | 9/1992 | Genheimer et al. . | |
| 5,216,655 | * 6/1993 | Hearn et al. ............................ | 369/58 |
| 5,237,553 | 8/1993 | Fukushima et al. . | |
| 5,610,776 | * 3/1997 | Oh ......................................... | 360/53 |
| 5,774,285 | * 6/1998 | Kassab et al. ....................... | 360/53 X |
| 5,954,837 | * 9/1999 | Kim ................................... | 360/53 X |

* cited by examiner

*Primary Examiner*—Alan T. Faber
(74) *Attorney, Agent, or Firm*—Robert E. Bushnell

(57) ABSTRACT

A data sector reassigning technique in a hard disk drive detects of a soft defect in a hard disk drive having a plurality of data sectors and an error correction capability. An error rate is calculated during a data read, and a soft defect is detected by varying the error correction capability according to the calculated error rate. A read error of the detected soft defect is recovered by setting the error correction capability to a maximum level if the read error is not recovered, and a spare sector is reassigned to substitute for a corresponding sector.

15 Claims, 2 Drawing Sheets

TECHNIQUE FOR REASSIGNING DATA SECTOR BY DETECTING SOFT DEFECT

CLAIM OF PRIORITY

This application makes reference to, incorporates the same herein, and claims all benefits accruing under 35 U.S.C. § 119 from an application for METHOD FOR REASSIGNING DATA SECTOR BY DETECTING SOFT DEFECT earlier filed in the Korean Industrial Property Office on the Jul. 26$^{th}$ 1997 and there duly assigned Serial No. 35381/1997.

BACKGROUND OF THE INVENTION

1. Field of the Invention

The present invention relates to a data sector reassigning technique in a hard disk drive, and a disk surface using SMART (Self Monitoring Analysis & Reporting Technology).

2. Description of the Related Art

In a hard disk drive used as an auxiliary memory device of a computer system, growable soft defects are beforehand detected from a data sector, and another normal data sector is reassigned to substitute for the defective data sector. This is called automatic reassignment. Detection of the growable soft defects is performed mainly by varying an ECC (Error Correction Code) correction capability. In this method, data is read with a low ECC correction capability in an early stage. If an ECC error is generated during the data read, it is determined whether the error is recovered by an error recovery routine. If the error is not recovered, the ECC correction capability is set to a maximum and the data is re-read. Then, if the data is read without any error, the read data is written in a remapped, that is, reassigned data sector.

However, the above method has the following drawbacks. Data sectors having growable soft defects cannot be accurately estimated because the ECC correction capability is set to a maximum without consideration of head performance or disk characteristics. Hence, too many data sectors unnecessarily turn out defective. That is, assuming that a normal ECC correction capability is 1, a maximum ECC correction capability is 2, and an error rate increases at the ECC correction capability of 1, the ECC correction capability is set to 2 according to the above method. As a result, data sectors having soft defects unlikely to grow are determined to be defective sectors, lowering the total performance of the drive.

The following patents each disclose features in common with the present invention but do not teach or suggest the technique for reassigning a data sector by detecting a soft defect as in the present invention: U.S. Pat. No. 5,237,553 to Fukushima et al, entitled Data Recording And Reproducing Apparatus Having A Plurality Of Operating Modes, and U.S. Pat. No. 5,150,050 to Genheimer et al., entitled Adaptive Variable Threshold Qualification Level Circuit For Signal Processing In Disk Drives.

SUMMARY OF THE INVENTION

An object of the present invention is to provide a technique for reassigning a data sector by accurately detecting only growable soft defects, and changing an ECC correction capability according to an error rate varied with head/disk assembly characteristics.

To achieve the above object, there is provided a method of reassigning a data sector by detecting a soft defect in a hard disk drive having a plurality of data sectors and an error correction capability. In the data sector reassigning method, an error rate is calculated during a data read, a soft defect is detected by varying the error correction capability according to the calculated error rate, a read error of the detected soft defect is recovered by setting the error correction capability to a maximum level if the read error is not recovered, and a spare sector is reassigned to substitute for a corresponding sector.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described in detail referring to the attached drawings.

Figure 1:
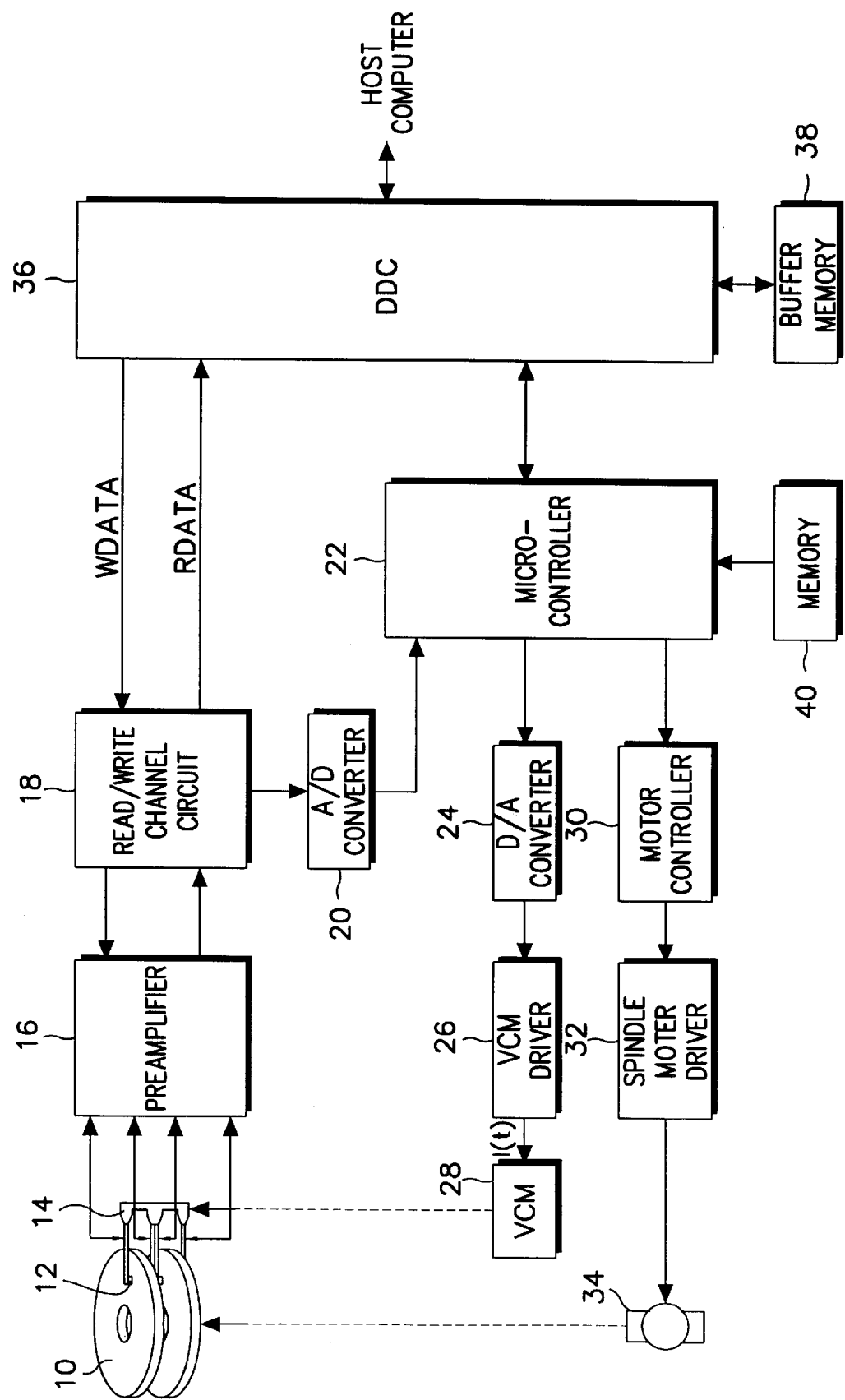
FIG. 1 is a block diagram of a hard disk drive.

FIG. 1 is a block diagram of a hard disk drive. In FIG. 1, the hard disk drive has, for example, two disks 10 and four heads 12 corresponding to the disks 10. Generally, the disks 10 are rotatably stacked around a driving shaft of a spindle motor 34, with each disk surface corresponding to one of the heads 12. Each of the disks 10 has a plurality of concentrically arranged tracks and includes a parking zone where a head 12 is positioned when the drive is inoperative, that is, power is off, and a maintenance area where replacement information with respect to a defective sector and various data for repairing and maintaining a system are recorded.

The heads 12 are positioned over the surfaces of the disks 10, and installed on arms 14 extended from an arm assembly of a rotary voice coil motor (VCM) 28. For reading data, a preamplifier 16 preamplifies a read signal picked up by one of the heads 12 and supplies the preamplified signal to a read/write channel circuit 18. On the other hand, for writing data, the preamplifier 16 records encoded write data supplied from the read/write channel circuit 18 on a disk 10 by driving a corresponding head 12. Here, the preamplifier 16 selects the head 12 under the control of a disk data controller (DDC) 36.

The read/write channel circuit 18 decodes the read signal supplied from the preamplifier 16, and generates read data RDATA. It also encodes write data WDATA supplied from the DDC 36 and supplies the encoded write data WDATA to the preamplifier 16. Further, the read/write channel circuit 18 demodulates head position information included in servo information recorded on the disks 10, generates a position error signal PES, and supplies the position error signal PES to an analog/digital (A/D) converter 20.

The A/D converter 20 converts the position error signal PES to a digital step value corresponding to its level, and sends the digital signal to a microcontroller 22. The DDC 36 records data received from a host computer on the disks 10 through the read/write channel circuit 18 and the preamplifier 16, or sends data reproduced from the disks 10 to the host computer. The DDC 36 also interfaces communication between the host computer and the microcontroller 22.

The microcontroller 22 controls the DDC 36 in response to a data read/write command received from the host computer. It also controls track seek and track following by means of the value of the position error signal PES received from the A/D converter 20, and performs a servo control in response to various servo-related signals output from a gate array (not shown). The microcontroller 22 controls the whole operation of the drive according to a control program stored in a memory 40.

A digital/analog (D/A) converter 24 converts a control value generated by the microcontroller 22, for controlling the positions of the heads 12, to an analog signal, and outputs the analog signal to a VCM driver 26. The VCM driver 26 generates a current I(t) for driving an actuator by means of the signal applied from the D/A converter 24, and applies the current I(t) to the VCM 28.

The VCM 28, positioned on one side of the actuator having the heads 12 attached to the other side thereof, moves the heads 12 horizontally over the disks 10 according to the direction and level of the current I(t) received from the VCM driver 26. A motor controller 30 controls a spindle motor driver 32 according to control values generated by the microcontroller 22, for controlling rotation of the disks 10. The spindle motor driver 32 rotates the disks 10 by driving a spindle motor 34 under the control of the motor controller 30. A buffer memory 38 connected to the DDC 36 temporarily stores data transmitted between the host computer and the disks 10, and the memory 40 connected to the microcontroller 22 includes a ROM having a control program according to an embodiment of the present invention, and a RAM for storing data generated while controlling the drive.

Figure 2:
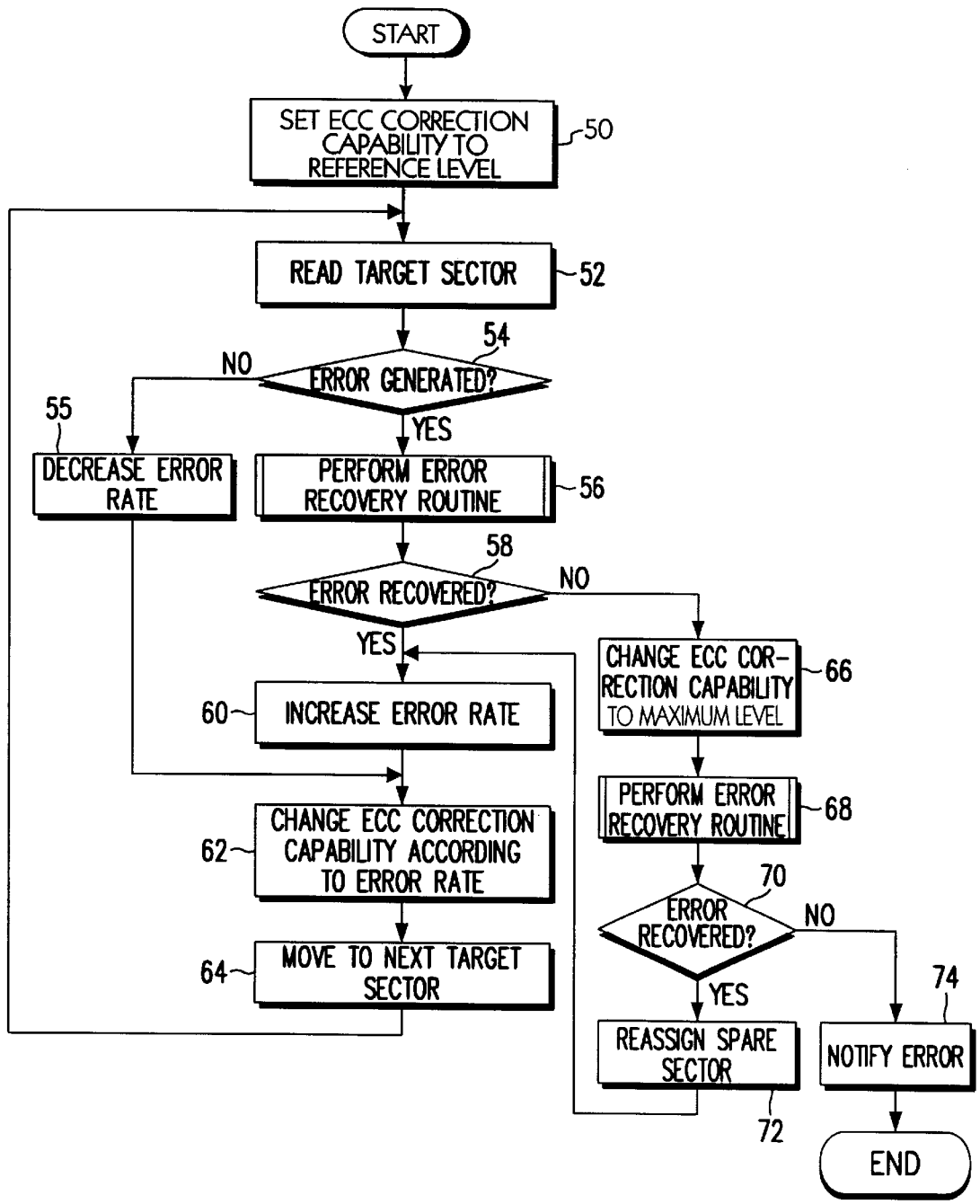
FIG. 2 is a flowchart of a data sector reassigning process based on soft defect detection according to an embodiment of the present invention.

FIG. 2 is a flowchart of a data sector reassigning process based on soft error detection according to an embodiment of the present invention.

Referring to FIGS. 1 and 2, a process of varying an ECC correction capability to detect only growable soft defects is described as follows.

In step 50, the microcontroller 22 sets an ECC correction capability to a reference level. It is assumed in the embodiment of the present invention that the microcontroller 22 can increase the ECC correction capability to a maximum of 4 and the initial reference level is 2. The initial reference level is set to 50% of the maximum correction capability, and the microcontroller 22 implements an initial data read operation on the basis of the reference ECC correction capability. That is, upon receipt of a data read command from the host computer, the microcontroller 22 reads data written in a target sector, in step 52. In step 54, the microcontroller 22 checks whether an ECC error has been generated during the data read. If an ECC error has not been generated, the microcontroller 22 reduces the error rate in step 55, and the procedure jumps to step 62. On the other hand, if an ECC error is found in step 54, the microcontroller 22 performs an error recovery routine, in step 56, and checks whether the error was recovered, in step 58. If it is determined that the error was not recovered in step 58, the microcontroller 22 sets the ECC correction capability to a maximum level (i.e., 4) in step 66, and performs the error recovery routine in step 68. In step 70, the microcontroller 22 determines whether the error was recovered. If the error was not recovered, the microcontroller 22 notifies the host computer of the existence of the error, in step 74. If it is determined that the error was recovered in step 70, the microcontroller 22 processes a corresponding target sector as a defective sector using a known method and a spare sector is reassigned as a data sector, in step 72. Then, the procedure goes back to step 60.

If it is determined that the error was recovered in step 58, the microcontroller 22 increases the error rate in step 60, and varies the ECC correction capability according to the error rates calculated in steps 55 and 60, in step 62. That is, if an error rate is lower than a reference level with the ECC correction capability set to 2 as the initial reference level, the microcontroller 22 decreases the ECC correction capability to 1, in step 62, to more accurately detect growable soft defects. Though the soft error rate may increase at the decreased ECC correction capability, an accurate estimation is possible for the time being. On the contrary, if the error rate is higher than the reference level at the ECC correction capability of 2, the microcontroller 22 increases the ECC correction capability to 3, in step 62. That is, if an error rate calculated at a given ECC correction capability is higher than the reference level, the microcontroller 22 increases the ECC correction capability, and if the error rate is lower than the reference level at the given ECC correction capability, it decreases the ECC correction capability, in step 62. Then, the microcontroller 22 moves to a next target sector in step 64, and repeatedly performs steps 52–74. Thus, an optimum ECC correction capability is derived in real time.

As described above, the present invention accurately detects growable soft defects only, by varying an ECC correction capability according to an error rate which changes depending on head/disk assembly characteristics. As a result, an optimum drive performance can be expected.

While the present invention has been described in detail with reference to the specific embodiment, the present invention is not limited to the embodiment. Thus, it is to be clearly understood that many variations can be made by anyone skilled in the art within the scope and spirit of the present invention.

What is claimed is:

1. A method of reassigning a data sector by detecting a soft defect during reading data in a hard disk drive, said method comprising the steps of:
   (1) during reading data of a target sector, performing an error recovery routine when an error is generated in an initial error correction capability;
   (2) determining whether an error is recovered after performing said error recovery routine;
   (3) repeating the error recovery step, while varying the initial error correction capability (ECC), if the error is not recovered; and if the error is recovered in an ECC not having a maximum, increasing an error rate; and if the error is recorded in a maximum ECC, reassigning the data sector to a preliminary sector to increase an error rate;
   (4) decreasing the error rate if the error is not generated during reading data of a target sector; and
   (5) setting an error correction capability based on an error rate calculated by increasing and decreasing the error rate and reading data of a next target sector.

2. The method as claimed in claim 1, the error correction capability being decreased if the calculated error rate is lower than a reference level, and increased if the calculated error rate is higher than the reference level.

3. A method of reassigning a data sector by detecting a soft defect in a hard disk drive having a plurality of data sectors and an error correction capability, comprising the steps of:
   (a) setting the error correction capability (ECC) to a reference level;
   (b) reading a target sector;
   (c) determining whether an error has been generated;

(d) performing an error recovery routine if the error is generated;

(e) decreasing the error rate if the error is not generated;

(f) determining whether the error is recovered after performing the error recovery routine;

(g) increasing an error rate if the error is recovered;

(h) changing the error correction capability to a maximum error correction capability having maximum level if the error is not recovered;

(i) performing an error recovery routine by setting the error correction capability to a maximum level;

(j) determining whether the error is recovered after performing the error recovery routine by maximum error correction capability;

(k) if the error is recovered, reassigning data of a target sector to a preliminary sector to proceed to step (e);

(l) changing the error correction capability in accordance with the error rate determined by steps (e) and (i); and (m) if he error correction capability is set in step (l), moving to a next target sector and jumping to step (b).

4. An apparatus for reassigning a data sector by detecting a soft defect in a hard disk drive having a plurality of data sectors and an error correction capability, comprising:

a calculating means for calculating an error rate during a data read;

a detecting means for detecting a soft defect, while varying the error correction capability according to the calculated error rate;

a recovery means for recovering a read error of the detected soft defect by setting the error correction capability to a maximum level if the read error is not recovered and for increasing the error rate if the read error is recovered; and a reassigning means for reassigning a spare sector to substitute for a corresponding sector.

5. The apparatus as claimed in claim 4, the detecting means and the recovery means decreasing the error correction capability if the calculated error rate is lower than a reference level, and increasing the error correction capability if the calculated error rate is higher than the reference level.

6. The apparatus of claim 4, further comprising a means for increasing the error rate after detection that a read error is recovered.

7. In a hard disk drive having a plurality of data sectors, a susceptibility to soft defects, and a correction means for correcting errors, the improvement comprising said correction means comprising;

a first means for calculating an error rate during a data read;

a second means for detecting a soft defect, while varying the error correction capability according to the calculated error rate;

a third means for recovering a read error of the detected soft defect by setting the error correction capability to maximum level if the read error is not recovered;

a fourth means for reassigning a spare sector to substitute for a corresponding sector upon recovering in accordance with the error correction capability; and a fifth means for increasing the error rate if the read error is recovered or a spare sector has been reassigned.

8. In a hard disk drive having a plurality of data sectors, a susceptibility to soft defects, and a correction means for correcting errors, the improvement comprising said correction means comprising;

a first means for setting the error correction capability to a reference level;

a second means for reading a target sector;

a third means for determining whether an error has been generated and if so jumping forward to the fourth means and if not jumping forward to the fifth mean;

a fourth means for performing an error recovery routine and jumping to the eighth means;

a fifth means for decreasing the error rate and jumping to the sixth means;

a sixth means for changing the error correction capability according to the error rate and jump to the seventh means;

a seventh means for moving to the next target sector and jumping back to the second means;

a eighth means for determining if the error has been recovered and if so jumping to the ninth means and if not jumping to the tenth means;

a ninth means for increasing the error rate and jumping to the sixth means;

a tenth means for changing the error correction capability to a maximum level and jumping to the eleventh means;

a eleventh means for performing error recovery routine and jumping to the twelfth means;

a twelfth means for determining if the error has been recovered and if not jumping to the thirteenth means and if so jumping to the fourth means;

a thirteenth means for notifying a user that an error has occurred; and a fourteenth means for reassigning a spare sector to substitute for a corresponding sector and jumping back to the ninth means.

9. In a method for correcting errors in a hard disk drive having a plurality of data sectors, a susceptibility to soft defects, and a means for correcting errors, said method including steps for detecting a soft error and for reassigning a data sector responding to said detection, the improvement comprising a step for increasing the error rate if the read error is recovered or a spare sector has been reassigned.

10. A method of reassigning a data sector by detecting a soft defect in a hard disk drive having a plurality of data sectors and an error correction capability, said method comprising the steps of:

calculating an error rate during a data read;

detecting a soft defect, while varying the error correction capability according to the calculated error rate;

recovering a read error of the detected soft defect by setting the error correction capability to a maximum level if the read error is not recovered; and then reassigning a spare sector to substitute for a corresponding sector; and increasing the error rate if the read error is recovered or a spare sector has been reassigned.

11. The method as claimed in claim 10, the error correction capability being decreased if the calculated error rate is lower than a reference level, and increased if the calculated error rate is higher than the reference level.

12. A method of reassigning a data sector by detecting a soft defect in a hard disk drive having a plurality of data sectors and an error correction capability, comprising the steps of;

(a) setting the error correction capability to a reference level;

(b) reading a target sector;

(c) determining whether an error has been generated and if so jumping forward to step (d) and if not jumping forward to step (e);

(d) performing an error recovery routine and jumping to step (h);

(e) decreasing the error rate and jumping to step (f);

(f) changing the error correction capability according to the error rate and jump to step (g);

(g) moving to the next target sector and jumping back to step (b);

(h) determining if the error has been recovered and if so jumping to step (i) and if not jumping to step (j);

(i) increasing the error rate and jumping to step (f);

(j) changing the error correction capability to a maximum level and jumping to step (k);

(k) performing error recovery routine and jumping to step (l);

(l) determining if the error has been recovered and if not jumping to step (m) and if so jumping to step (n);

(m) notifying a user that an error has occurred; and (n) reassigning a spare sector to substitute for a corresponding sector and jumping back to step (i).

13. An apparatus for reassigning a data sector, comprising;

a memory storing an operational control program; and a controller implementing read operations in accordance with said operational control program, by reading data from a target sector of a hard disk within a hard disk drive having and error correction capability and comprised of a plurality of data sectors, while said error correction capability is set at a reference level, by establishing an error rate while reading said data, by detecting a soft defect while varying the error correction capability in accordance with said error rate established, by recovering a read error of the detected soft defect by setting the error correction capability to a maximum level if the read error is not recovered and by increasing the error rate if the read error is recovered, and by reassigning a space sector to substitute for a corresponding sector.

14. The apparatus as claimed in claim 13, further comprised of said controller decreasing the error correction capability if the calculated error rate is lower than a reference level, and increasing the error correction capability if the calculated error rate is higher than the reference level.

15. The apparatus of claim 13, further comprising said controller increasing the error rate after detection that a read error is recovered.

* * * * *